(No Model.) 3 Sheets—Sheet 1.
C. P. HIGGINS.
MACHINE FOR FORMING SERPENTINE TUBES.
No. 336,854. Patented Feb. 23, 1886.
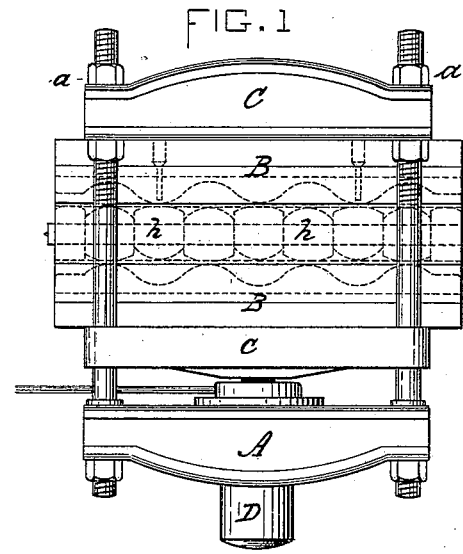
FIG. 1
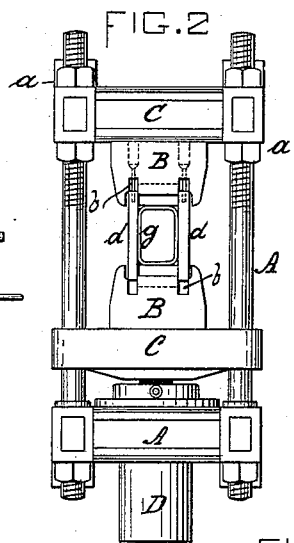
FIG. 2
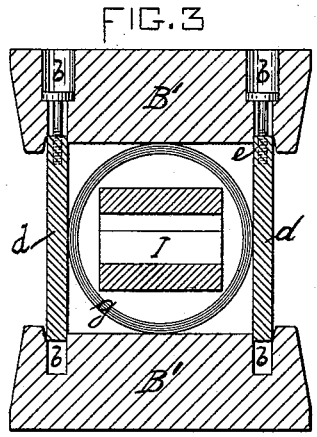
FIG. 3
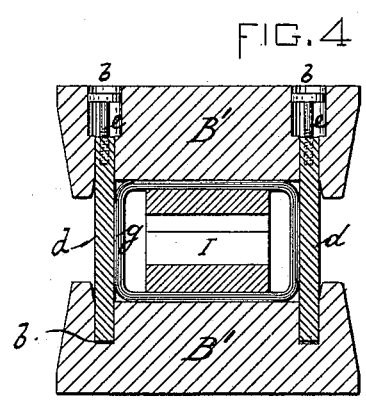
FIG. 4
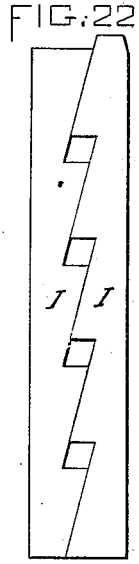
FIG. 22
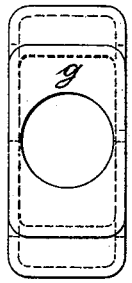
FIG. 5
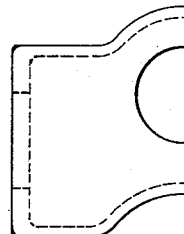
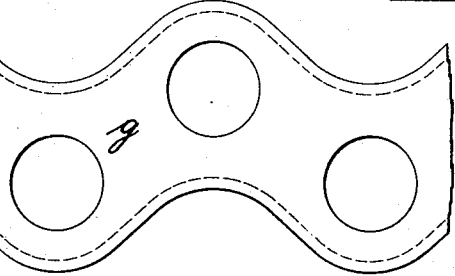
FIG. 6
WITNESSES:
Aug Creveling
A. M. Kirtland
INVENTOR
Campbell P. Higgins
by Chas. W. Forbes
Atty.
N. PETERS. Photo-Lithographer, Washington, D. C.

(No Model.) 3 Sheets—Sheet 2.
C. P. HIGGINS.
MACHINE FOR FORMING SERPENTINE TUBES.
No. 336,854. Patented Feb. 23, 1886.
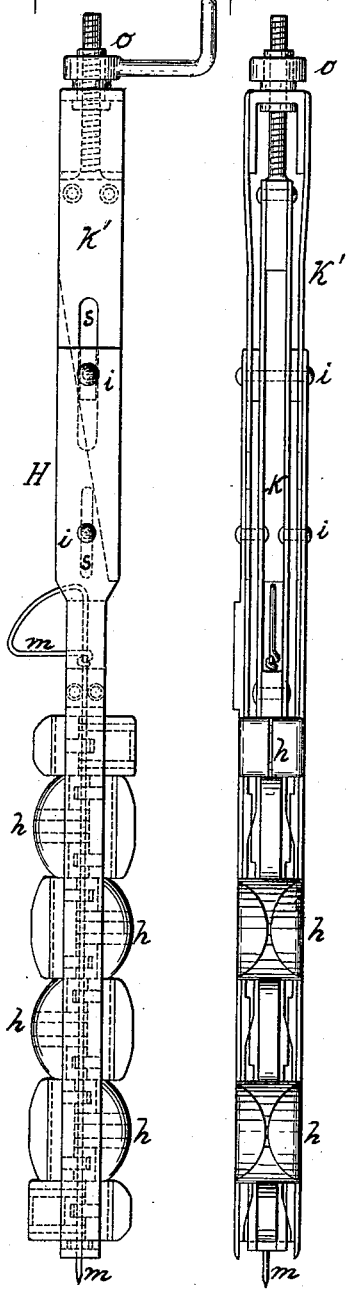
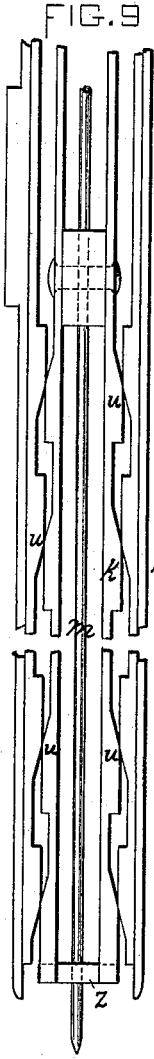
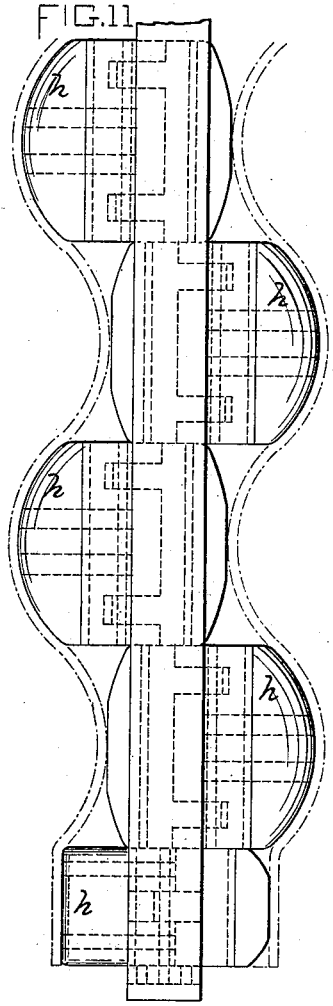
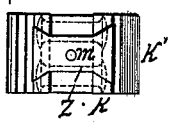
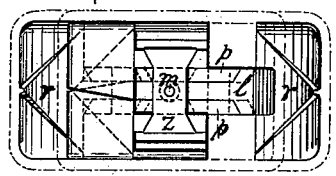

(No Model.)  3 Sheets—Sheet 3.
C. P. HIGGINS.
MACHINE FOR FORMING SERPENTINE TUBES.
No. 336,854. Patented Feb. 23, 1886.
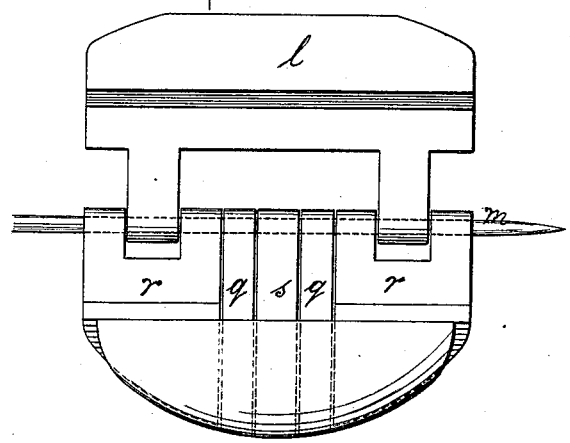
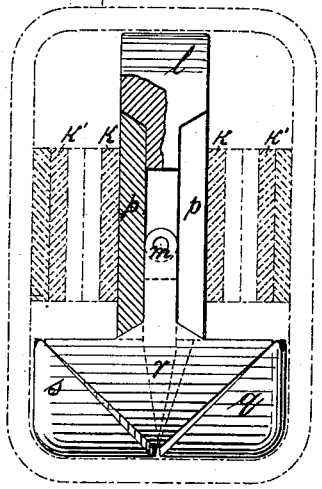
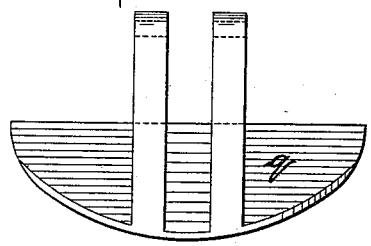
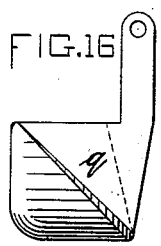
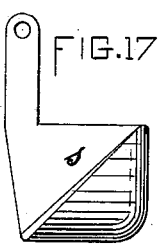
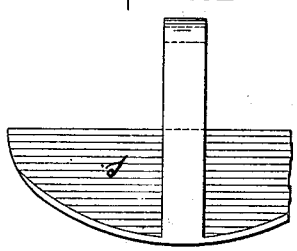
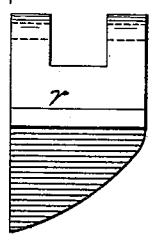
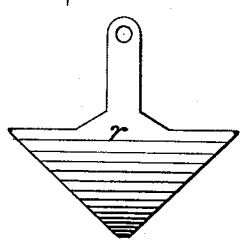
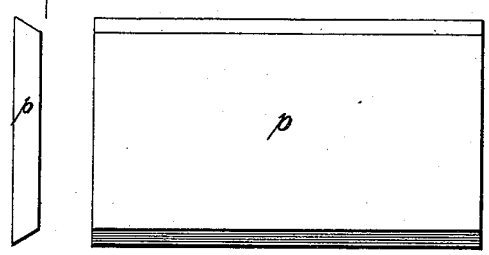
WITNESSES:
Aug Creveling
H. M. Kirtland
INVENTOR
Campbell P. Higgins
By Chas. W. Forbes
Atty.

UNITED STATES PATENT OFFICE.

CAMPBELL P. HIGGINS, OF PHILADELPHIA, PENNSYLVANIA.

MACHINE FOR FORMING SERPENTINE TUBES.

SPECIFICATION forming part of Letters Patent No. 336,854, dated February 23, 1886.

Application filed October 10, 1885. Serial No. 179,494. (No model.)

*To all whom it may concern:*

Be it known that I, CAMPBELL P. HIGGINS, a citizen of the United States, residing at Philadelphia, Pennsylvania, have invented a new and useful Improvement in Machines for Forming Serpentine Tubes, of which the following is a specification, reference being had to the accompanying drawings, in which—

Figure 1 is a side elevation; Fig. 2, an end view; Fig. 3, a cross-section showing a round pipe-blank and the relative position of the parts of the machine ready for squaring the blank; Fig. 4, a cross-section of the same, showing the round tube formed into a polygonal blank, and the relative position of the parts of the machine after the completion of the operation; Figs. 5 and 6, a side and end view of the completed header after it has passed through the operations of squaring, forming, and punching, and with an end welded in to receive end connection; Figs. 7 and 8, side and plan views of the mandrel; Figs. 9 and 10, enlarged side and end views of the mandrel-spreading device; Figs. 11 and 12, enlarged side and end views of the corrugated tube and the parts of the mandrel, and Figs. 13, 14, 15, 16, 17, 18, 19, 20, and 21, enlarged views of the various parts of the mandrel. Fig. 22 shows a sectional mandrel for squaring tubes.

Similar letters of reference indicate corresponding parts of the several figures.

This invention is specially designed to form serpentine headers of rectangular shape in cross-section from round welded pipe for use in sectional steam-boilers; and in order that others may understand and use the same I will proceed to describe the same in detail of construction, explain its operation, and subsequently point out in the appended claims its novel characteristics.

Referring to the drawings, A represents a frame-work supporting dies or formers B B, constructed with longitudinal working-faces of serpentine form, or B' B' with flat working-faces. These dies are made capable of vertical movement, and in the present instance are connected to cross-beams C C. The upper cross-beam is adjusted vertically by means of the nuts $a\ a$ upon the threaded standards of the frame A, as shown. The lower cross-beam is fitted to slide vertically upon said standards, and rests upon a sliding plunger, D, operated by a hydraulic press, or by other suitable means. The dies B' and B' are grooved, as shown at $b$, in which sliding plates $d\ d$ are arranged, said plates being held in position by the screws $e$ and $e$, so as to allow a vertical movement in said grooves.

I is a section of a square mandrel employed to square the blank upon, which is, by preference, made in sections, and capable of contraction and expansion by a longitudinal movement of one section upon the other, the respective sections being constructed with inclined bearing-surfaces to effect such purpose, as shown in Fig. 22.

The sectional mandrel H, for corrugating the square blank, is composed of separate blocks $h$, arranged within a frame-work, Fig. 9, and is held in position by the rod $m$, passing through the sections, this rod being removed after the mandrel is placed within the squared blank $g$. The frame of the mandrel is composed of two parts, $k\ k'$, the part $k$ being arranged within the part $k'$, and made capable of a longitudinal movement by means of the hand-screws $o$, the parts being held together and in place by the bolts $i$, that pass through elongated slots $s$ in the part $k'$, and the loose key-piece Z. Upon adjacent sides of the parts $k\ k'$ a series of cams, $u$, and corresponding depressions are provided, for the purpose of separating the same by a longitudinal adjustment of the part $k$.

The blocks $h$ are composed of separate parts $l\ p\ q\ r\ s$. (Shown detached and enlarged in Figs. 13 to 20 of the drawings.) Such parts are constructed in substantially the form shown, and are relatively assembled to form the block $h$, as shown in Figs. 1, 2, 7, 8, 12, 13, and 14. These blocks $h$ are rounded on their working-faces to conform to the corresponding depressions in the dies B, and the various parts of which they are composed are made in such shape or contour that when pressure is applied the inclined contact-surfaces force the parts firmly against the sides of the blank.

The operation of the machine is as follows: The dies B' B' are separated, as shown in Fig. 3, and a blank, $g$, of cylindrical form, placed between them and the side plates, $d\ d$. A square mandrel, I, is then introduced into the interior of the blank, as shown in Fig. 3, and the dies B' B', having flat parallel surfaces, then compressed thereon, which changes the form of the blank to a polygonal shape in cross-section, as shown in Fig. 4, two of the faces of the header being formed by pressure exerted between the faces of the dies and the inclosed mandrel, the two opposite sides being formed by the pressure of the pipe against the sliding abutments d d. The dies B' B' are then relaxed, the mandrel I removed, and the sectional mandrel H substituted, as shown in Figs. 1 and 2, and the dies B B substituted for B' B'. The blocks being now supported by the blank h, the part k of the mandrel is moved longitudinally by the hand-screw o, which, by means of the cam-faces u, separates or spreads the sides k firmly against the adjacent sides of the blank g, and, through the inner wedge-pieces, p p, forces the faces of each of the movable blocks forming the mandrel against the two opposite sides and locks them in position. The suspension-rod m is then withdrawn, to allow of cross-movement of the blocks h. The dies B B are now advanced together, the projecting portion of their working-faces acting in contact with the faces of the respective adjacent block h, which force the blank into the opposite corresponding depressions in the dies and produce the completed serpentine blank, as shown in Fig. 11. The part k of the mandrel is now relaxed by turning back the hand-screw o, which brings the cam-faces u within the corresponding adjacent recesses in the part k', and permits its withdrawal, the end piece, Z, dropping out, the side plates, p, of the blocks h being thereby relieved, which in turn release the other parts, and the sectional blocks may be dropped out in pieces. The dies B B are now returned to their open position, when the mandrel may be reassembled, ready for a repetition of the operation.

Having thus fully described my invention, what I claim, and desire to secure by Letters Patent, is—

1. A machine for forming tubes or blanks of polygonal form in cross-section, consisting of a pair of dies joined together by sliding abutments, in combination with a sectional mandrel.

2. A machine for forming serpentine headers or tubes of polygonal form in cross-section, consisting of a pair of working-dies having their acting faces constructed with transverse depressions, and a mandrel composed of movable sections corresponding to the depressions in the dies, said sections being made in separable parts, substantially as described.

3. In a machine for forming serpentine headers or tubes, the combination of a pair of working-dies having their acting faces constructed with transverse depressions, and a sectional mandrel provided with a series of separate blocks corresponding to the depressions in the dies and capable of a transverse movement in the same plane, said mandrel also containing an adjusting device for spreading out against the plain sides of the blank.

4. A sectional mandrel for the purpose set forth, having a series of blocks composed of separable parts constructed with wedging contact-surfaces, whereby said parts are expanded and forced against the adjacent surfaces of the blank by the pressure of the external dies.

CAMPBELL P. HIGGINS.

Witnesses:
 CHAS. F. SIMMONS,
 ALEXANDER RICKEY.